Figure 1:
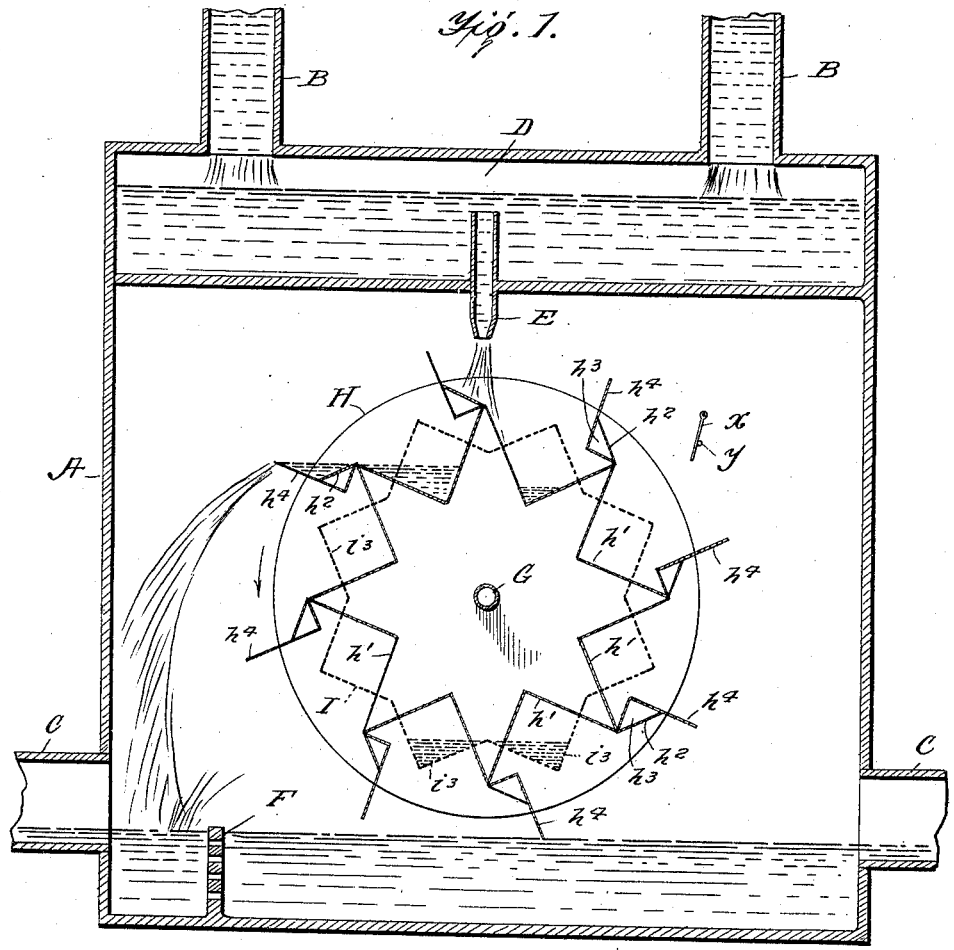

H. A. AUSTIN.
CONDENSATION METER.
APPLICATION FILED MAY 17, 1909.

964,837.

Patented July 19, 1910.
2 SHEETS—SHEET 1.

Witnesses
L. H. Schmidt.
H. E. Stonebraker.

Inventor:
Harry A. Austin,
By R. G. Dyrenforth,
his Attorney

H. A. AUSTIN.
CONDENSATION METER.
APPLICATION FILED MAY 17, 1909.
964,837.
Patented July 19, 1910.
2 SHEETS—SHEET 2.
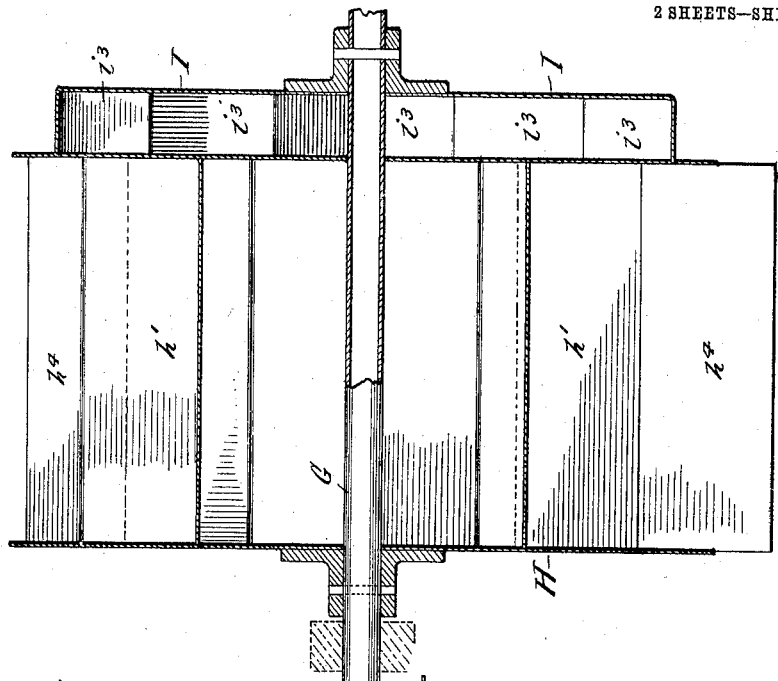
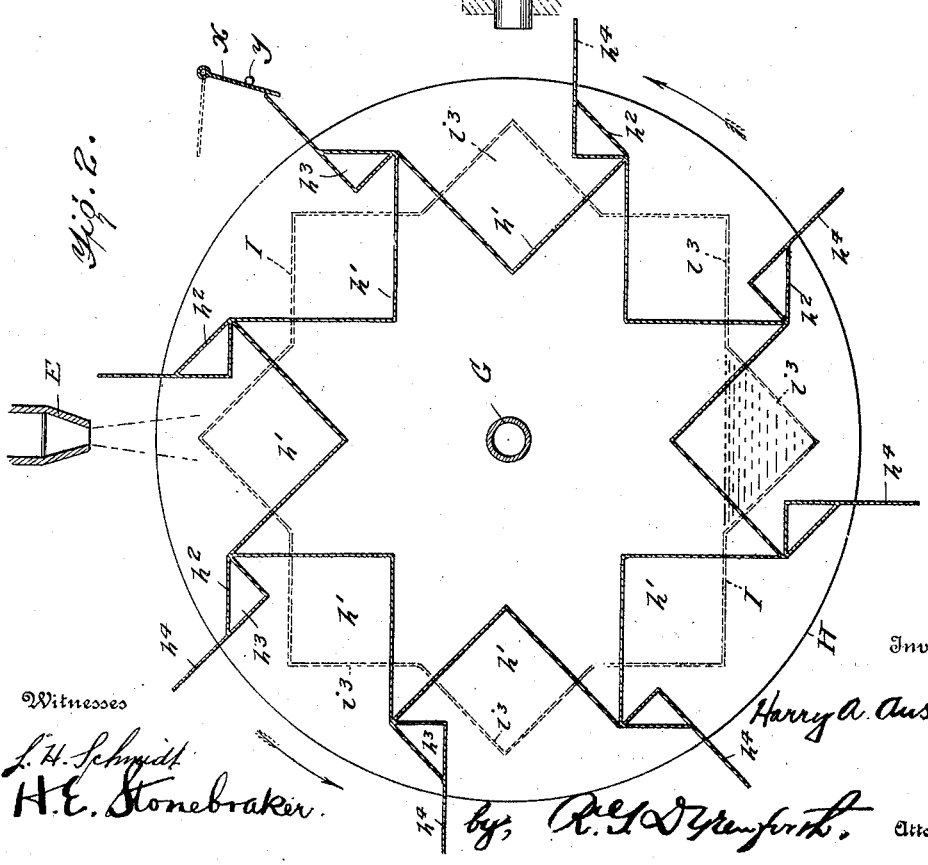

UNITED STATES PATENT OFFICE.

HARRY A. AUSTIN, OF LOCKPORT, NEW YORK.

CONDENSATION-METER.

964,837.  Specification of Letters Patent.   Patented July 19, 1910.

Application filed May 17, 1909.  Serial No. 496,513.

*To all whom it may concern:*

Be it known that I, HARRY A. AUSTIN, a citizen of the United States, residing at Lockport, in the county of Niagara and State of New York, have invented certain new and useful Improvements in Condensation-Meters; and I do hereby declare the following to be a full, clear, and exact description of the invention, such as will enable others skilled in the art to which it appertains to make and use the same.

My invention relates to improvements in condensation meters, and is applicable, equally as well, to either of the several types now in common use, including those which depend on a rotating element for measuring the amount of liquid passing through, and also others which employ an oscillating element for measuring the liquid.

The object of my invention is to afford greater accuracy in the measuring of liquids, and at once, facilitate the operation of the machine by controlling the movement of the liquid-measuring element, constantly, and at each successive actuation thereof. This, I accomplish by means of a balancing-member, which keeps the liquid-measuring element exactly poised until the proper amount of liquid has flowed in, to effect actuation and movement of the parts. Such control of the liquid-measuring element has been found, heretofore, to be a very serious obstacle, and hard to overcome. Variously constructed machines have been proposed for this purpose, in which the liquid to be measured, acts as a counterbalance for the liquid-measuring element, and controls its movement to a certain extent, but such devices have proved not altogether successful.

It is the object of my present improvement to provide an independent balancing-member, associated with the liquid-measuring element in such a way as to govern its successive movements quickly, and always at the proper instant. One means of accomplishing this, in connection with a meter of the rotary type, is by providing a drum rotating in unison with the liquid-measuring element. The drum is constructed with a series of pockets, of the same size and arranged at equal distances, and contains an amount of some heavy liquid such as mercury adapted to move successively from one pocket to the other during the rotation of the drum. The mercury is contained always at the bottom of the drum, and thus serves to hold it normally in a stationary position, from which it is moved by the overbalancing of the liquid in the respective pocket of the liquid-measuring element.

Various other objects and advantages will be apparent after consideration of the following specification and claims, wherein the invention is described in detail, and pointed out specifically.

In the accompanying drawings, forming a part of this specification, and in which I have only shown the preferred forms of the structure, merely as illustrations, and these being more or less of a diagrammatic nature, Figure I is a longitudinal sectional view of my invention as embodied in a meter of the rotary-bucket type, showing the same in operation, the balancing-drum being indicated by dotted lines; Fig. II is a detail view of the liquid-measuring drum in section, with the balancing-drum indicated in dotted lines, and showing the relation of the parts just previous to emptying of a bucket; Fig. III is a longitudinal sectional view of the liquid-measuring drum and the balancing-drum, connected thereto.

Referring more particularly to the drawings, in which like letters of reference indicate corresponding parts in the several views, A designates the casing of the meter, provided with inlets B and outlets C. In the upper part of the casing A is a chamber D for receiving the liquid from the inlet openings, and from which it passes to the measuring devices through a nozzle E. In the bottom of the casing A, is a perforated division-plate F, which serves to obviate any wave motion of the liquid contained in the casing, such being generally set up by discharge of liquid from the measuring-element.

G is a shaft which is preferably hollow, to permit passage of air-currents for cooling and upon which is mounted the liquid-measuring drum H, and the balancing-drum I attached thereto, and movable simultaneously with the same. The drum H is provided with a series of buckets $h'$, adjacent to which are the tables $h^2$, formed by air tight chambers $h^3$. $h^4$ are additional tables, arranged parallel with the sides of the buckets $h'$ respectively, and forming a continuation of the tables $h^2$, with which they form angles of 135° each.

The drum I, is provided with a series of pockets $i^3$ arranged directly opposite the corresponding buckets in the measuring-drum, as indicated in Figs. I and II. The drum I contains an amount of mercury or other suitable moving, heavy liquid, sufficient to fill one of the pockets $i^3$. The drum I is sealed when manufactured, with the liquid or mercury contained within the same, and is attached to the drum H, when the parts are assembled, in any convenient manner, as before stated.

A swinging-plate $x$ coöperates with a pin $y$ to prevent return movement of the rotating-drums.

The operation of the invention is believed to be apparent from the foregoing description, and briefly stated, is as follows: Considering Fig. II, let us assume that the bucket at the top of the drum H is empty and the pocket at the bottom of drum I is full of mercury. Liquid flows in from the receiving chamber D into bucket $h'$ at the top, filling it, until it overflows onto the table $h^2$ adjacent thereto. When the bucket $h'$ is full, but there is no liquid upon the table $h^2$ the drum is equally balanced, but as soon as any liquid overflows onto the table $h^2$, the bucket $h'$ is overbalanced, and commences to move. At the same instant, the mercury begins to overflow into the adjacent pocket on the left, thus increasing the speed of movement of the drums. At the half movement, or, that is to say, at the middle of the emptying period for one bucket, the parts are in the positions indicated in Fig. I, the drums having made one sixteenth of a turn. At this stage the mercury is equally distributed between the two bottom pockets, and liquid commences to fill into the next adjacent bucket of the liquid-measuring drum. At the completion of movement, and when the bucket at the top has been emptied, the next adjacent bucket on the right is filling, and the next adjacent balancing-pocket on the left is full, and affords, for the necessary time, a balancing weight, to hold the measuring-drum in proper position. This operation is repeated for each successive bucket.

The rotation of the measuring-drum is partially retarded by initial entrance of liquid into one measuring-bucket, before the next adjacent bucket has been entirely emptied. Such retardation is further effected by means of the projecting tables or flanges $h^4$, which engage the liquid contained in the bottom of the casing A as the drums rotate.

Thus, I have provided a structure which is completely balancing, possesses an accurate regularity of movement, and may be adjusted, in different sizes, to any degree of fine measuring necessary. The principle involved requires only the most simple kind of construction, and comparatively few number of parts which can readily be assembled.

It is, of course, understood, that my invention is not limited in any sense to the exact form or forms of construction herein shown and described, but may be applied in different ways to many machines for this purpose, and the particular structures which I have shown here, are intended only for purposes of illustration, and as showing possible embodiments of the invention.

Any modification or device coming within the scope and intention of my improvement, is to be covered by the present application and claims.

Having thus fully described the invention, what I desire to secure by Letters-Patent and claim is:

1. In a liquid meter, the combination with a measuring drum provided with a series of buckets, tables arranged adjacent said buckets, flanges forming continuations of said tables and parallel with the sides of the buckets, a sealed drum connected to and movable with said measuring drum, pockets within the last mentioned drum, and a shifting weight movable in said pockets.

2. In a liquid meter, the combination with a measuring drum provided with a series of buckets, tables arranged adjacent said buckets, flanges forming continuations of said tables and parallel with the sides of the buckets, a sealed drum connected to and movable with said measuring drum, pockets within the last mentioned drum, and a shifting liquid weight movable in said pockets.

3. In a liquid meter, the combination with a measuring drum provided with buckets, air tight compartments adjacent said buckets and forming tables at their upper edges, flanges arranged parallel with the sides of the buckets and extending from the extremities of said tables, a sealed balancing drum secured to and movable with said measuring drum, pockets within the balancing drum, and a shifting weight movable in said pockets.

4. In a liquid meter, the combination with a measuring drum provided with buckets, air tight compartments adjacent said buckets and forming tables at their upper edges, flanges arranged parallel with the sides of the buckets and extending from the extremities of said tables, a sealed balancing drum secured to and movable with said measuring drum, pockets within the balancing drum, and a shifting liquid weight in said pockets.

In testimony whereof, I affix my signature, in the presence of two subscribing witnesses.

HARRY A. AUSTIN.

Witnesses:
 FRED D. MOYER,
 EBENEZER BEATTIE.